(12) United States Patent
Wu (10) Patent No.: US 7,281,835 B2
(45) Date of Patent: Oct. 16, 2007

(54) BACKLIGHT MODULE FOR FLAT PANEL DISPLAY

(75) Inventor: Meng-Chai Wu, Jhubei (TW)

(73) Assignee: AU Optronics Corp., Hsinchu (TW)

( * ) Notice: Subject to any disclaimer, the term of this patent is extended or adjusted under 35 U.S.C. 154(b) by 61 days.

(21) Appl. No.: 11/192,829

(22) Filed: Jul. 29, 2005

(65) Prior Publication Data

US 2006/0181900 A1    Aug. 17, 2006

(30) Foreign Application Priority Data

Feb. 16, 2005  (TW) .............................. 94104440 A (51) Int. Cl.
*F21V 9/04* (2006.01)
*F21V 7/04* (2006.01)
(52) U.S. Cl. .................. 362/609; 362/611; 362/293
(58) Field of Classification Search ................ 362/263, 362/264, 293, 294, 608, 609, 611, 622, 624, 362/627, 629
See application file for complete search history.

(56) References Cited

U.S. PATENT DOCUMENTS 4,105,293 A * 8/1978 Aizenberg et al. .......... 362/629
4,460,939 A * 7/1984 Murakami et al. .......... 362/609
6,382,824 B1 * 5/2002 Prasad et al. ............... 362/293
6,669,350 B2 * 12/2003 Yamashita et al. .......... 362/611

FOREIGN PATENT DOCUMENTS

JP          407333169 A   * 12/1995

* cited by examiner

Primary Examiner—Y. My Quach-Lee
(74) Attorney, Agent, or Firm—Thomas, Kayden, Horstemeyer & Risley (57) ABSTRACT

A backlight module and a flat panel display using the same. The backlight module comprises a light source device and light guide plate adjacent to the light source device. The light source device comprises a high intensity discharge lamp, a reflector having an opening and surrounding the high intensity discharge lamp, and a cover covering the opening. The high intensity discharge lamp radiates so brilliant that it can be a single light source. When single light source is failed, it is convenient to solely exchange a new one at once. The flat panel display comprises the backlight module and a display panel disposed over the light guide plate. The light source device and the light guide plate are applied to the flat panel display so that the replacement of the light source device for the flat panel display becomes convenient.

13 Claims, 9 Drawing Sheets

BACKLIGHT MODULE FOR FLAT PANEL DISPLAY

BACKGROUND

The invention relates to a flat panel display, and in particular to a backlight module for a flat panel display.

Backlight modules of flat panel displays are conventionally edge or direct types. Because the luminous flux of a small-sized display is lower, edge backlight modules are usually applied. Since large backlight modules require higher luminous flux, direct modules are used to increase light sources. Usually, 20.1 to 46 inch flat panel displays require 12 to 28 cold cathode fluorescent lamps.

Figure 1:
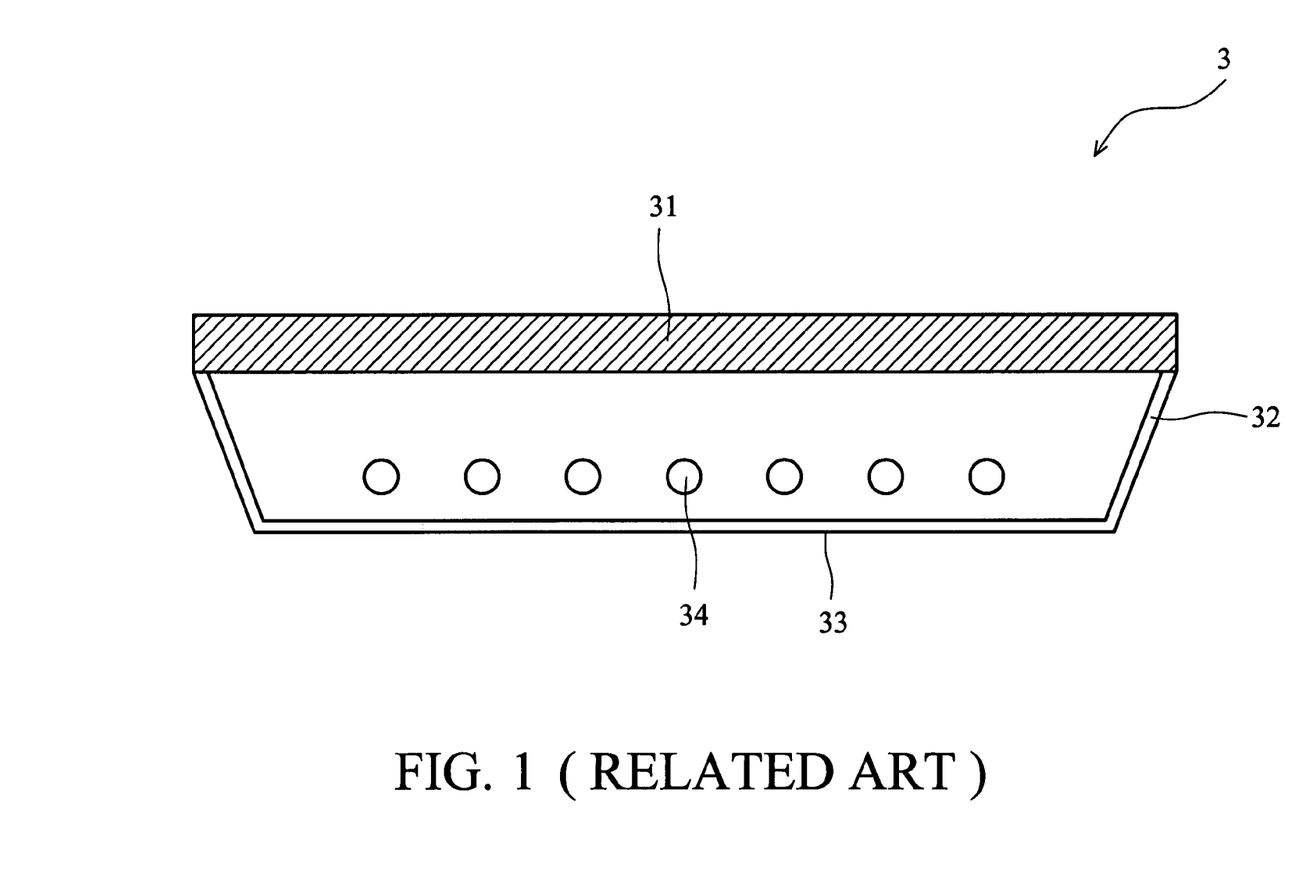
FIG. 1 is a schematic drawing of a conventional direct backlight module.

However, cold cathode fluorescent lamps decrease luminance thereof over time. Referring to FIG. 1, a direct backlight module 3 comprises a diffuser 31, a frame 32, a reflecting sheet 33, and tubes 34. The frame 32 connects the diffuser 31 and the reflecting sheet 33. The tubes 34 are disposed in the frame 32 and emit light reflected to the diffuser 31 by the reflecting sheet 33. Deterioration of each cold cathode fluorescent lamp, however, is different, causing uneven illumination. If new lamps only replace darker lamps, the new lamps are still brighter than other lamps not yet replaced, such that replacement all lamps simultaneously is required. Lifespan and convenient repair of displays are important market factors.

SUMMARY

It is an object of the present invention to provide a backlight module and a flat panel display utilizing the same. An exemplary embodiment of a backlight module comprises a light source and a light guide plate. The light guide plate is disposed in the vicinity of the light source. The light source comprises a high intensity discharge lamp, a reflector surrounding the high intensity discharge lamp and having an opening, and a cover disposed on the opening. Because the illumination of the high intensity discharge lamp is very high, usually only a single high intensity discharge lamp is required for a backlight module. When the lamp fails, it is easily replaced.

An exemplary embodiment of a flat panel display comprises a light source, a light guide plate, and a display panel. The light guide plate is disposed in the vicinity of the light source. The light source comprises a high intensity discharge lamp, a reflector surrounding the high intensity discharge lamp and having an opening, and a cover disposed on the opening. The display panel is disposed over the light guide plate. When the lamp fails, it is easily replaced.

An embodiment of a flat panel display comprises a light source disposed at one corner of the light guide plate to provide illumination.

Another embodiment of a flat panel display comprises a support at a side of the light guide plate. The light source is installed on the support to provide illumination.

Yet another embodiment of a flat panel display comprises two supports and two light sources. The light sources are disposed on the supports to provide illumination.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

Figure 2A:
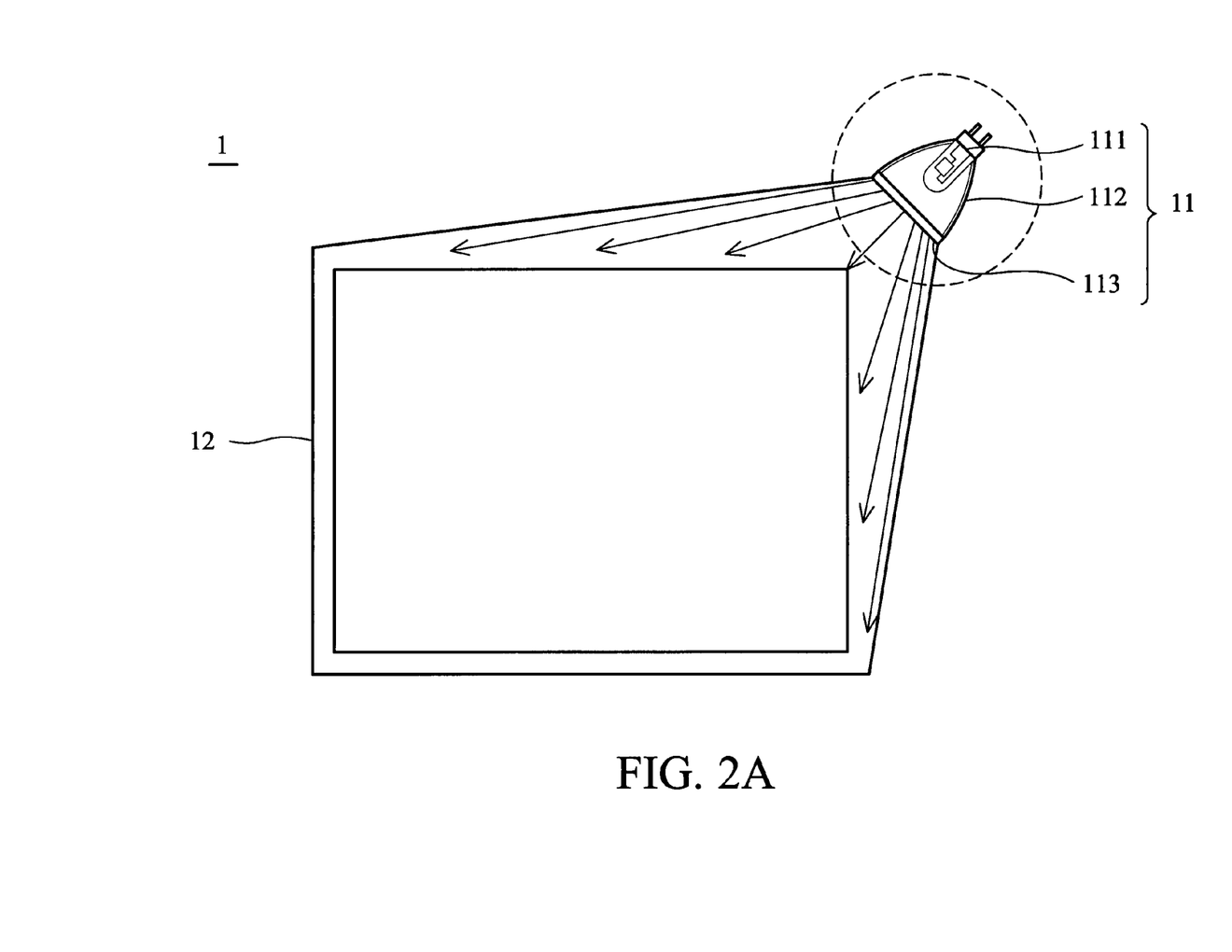
FIG. 2A is a schematic drawing of a backlight module according to an embodiment of the invention.
Figure 2B:
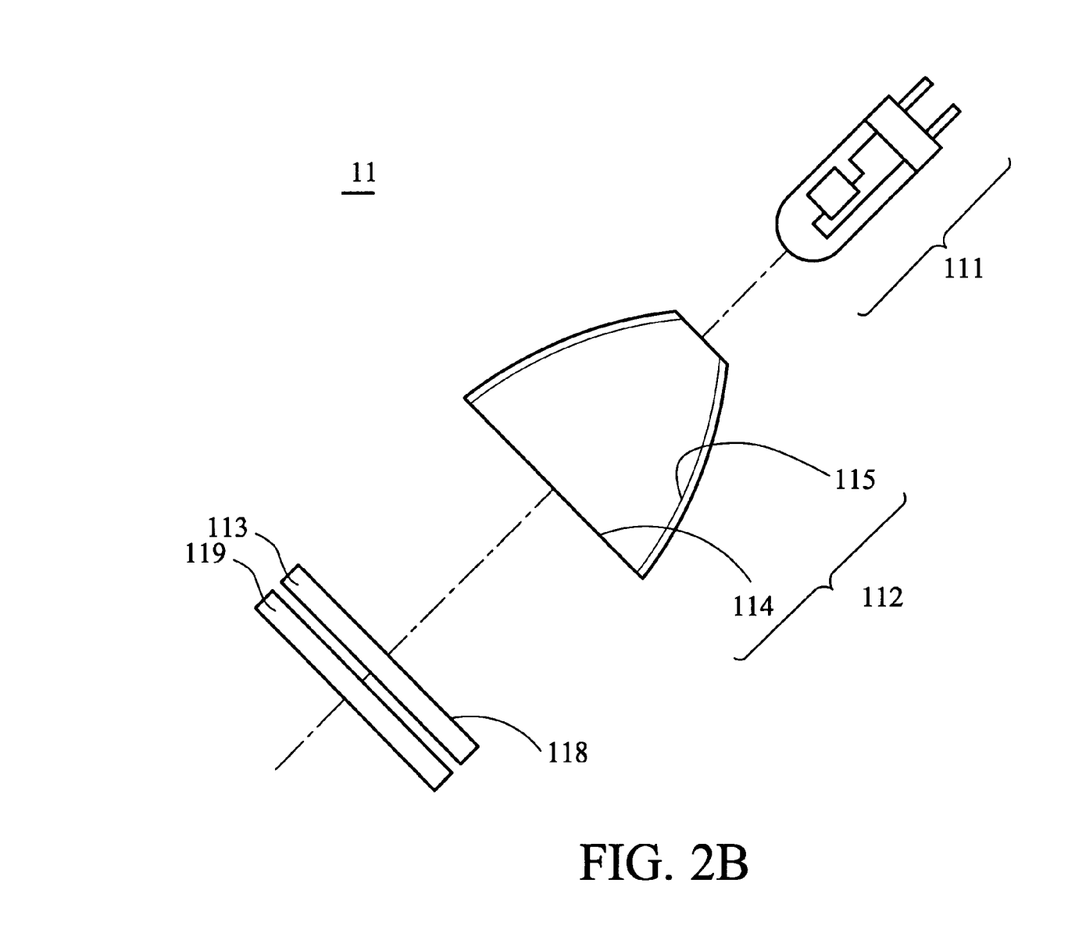
FIG. 2B is an exploded drawing of a light source of FIG. 2A.

Referring to FIGS. 2A and 2B, a backlight module 1 comprises a light source 11 and a light guide plate 12 disposed in the vicinity of the light source 11. The light source 11 comprises a high intensity discharge lamp 111, a reflector 112, and a cover 113. The reflector surrounds the high intensity discharge lamp 111 and has an opening 114. The cover 113 is disposed on the opening 114. The reflector 112 is parabolic, elliptical, or polyhedral. The high intensity discharge lamp 111 has high illumination efficiency of usually 901 m/W. For example, a 30-inch flat panel display requires about 30001 m of luminous flux, requiring only a single 35 W high intensity discharge lamp as backlight module 1. When the high intensity discharge lamp 111 is broken down, replacing only the single lamp 111 is required.

Figure 3:
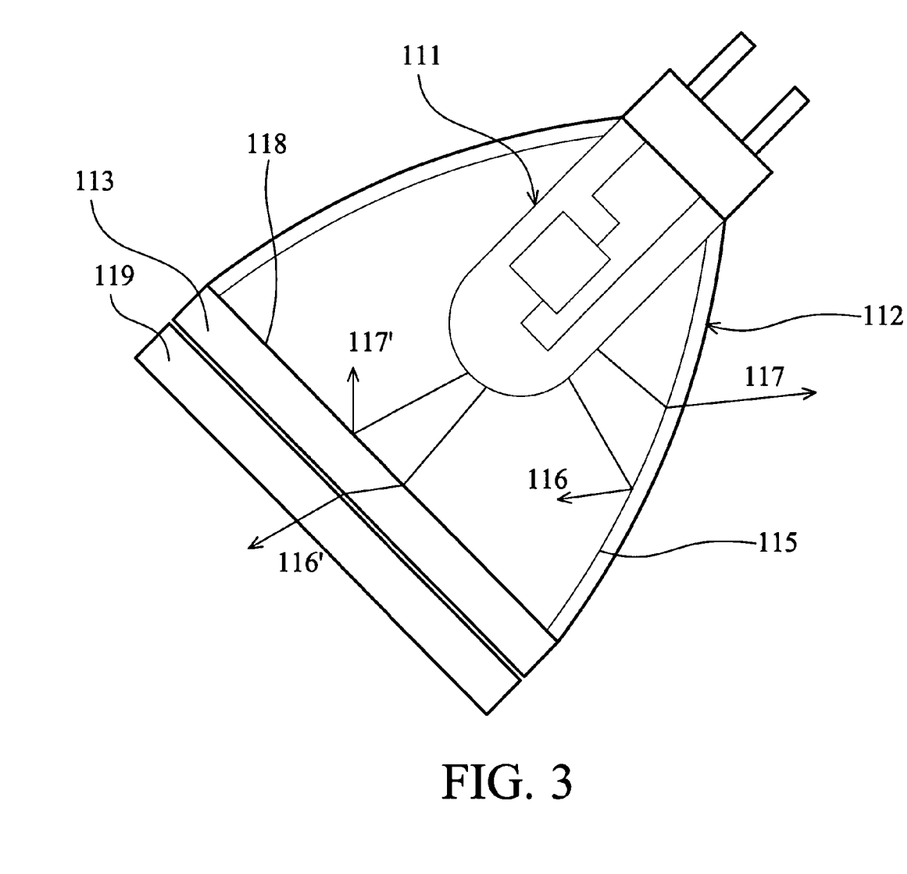
FIG. 3 is a partial enlarged view of FIG. 2A.

As shown in FIG. 3, the high intensity discharge lamp 111 emits visible light 116, 116' and infrared rays 117, 117'. The reflector 112 includes a cold mirror coating 115 formed thereon, reflecting the visible light 116 but enabling the infrared rays 117 to pass through. The cover 113 is pervious to light and heat-resistant, such as including a hot mirror coating 118 formed thereon. The hot mirror coating 118 reflects the infrared rays 117' but enables the visible light 116' to pass through. A light-diffusing unit 119 is disposed on the cover 113 and enables the visible light 116' to pass through. Because the high intensity discharge lamp 111 generates heat, the cold mirror coating 115 and the hot mirror coating 118 transmit illumination to the light guide plate 12 and dissipate heat to the outside of the backlight module 1 to avoid overheating.

Figure 4:
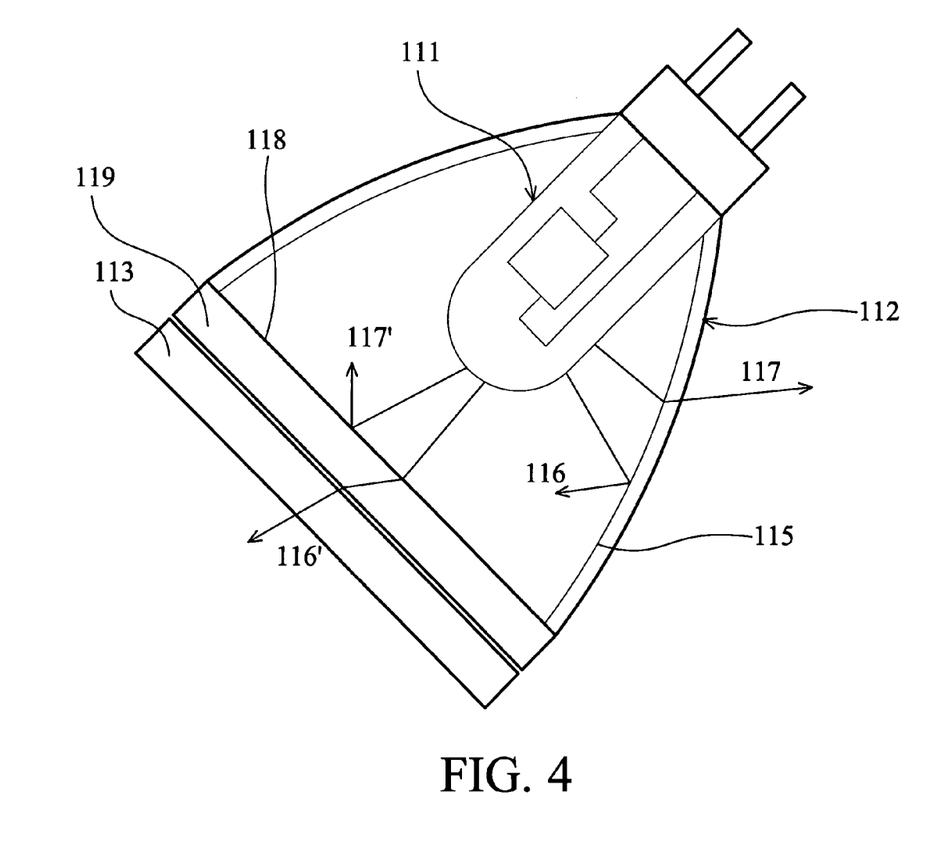
FIG. 4 is a schematic diagram of another embodiment of a light source.

As shown in FIG. 4, the positions of the cover 113 and the light-diffusing unit 119 in FIG. 3 can be reversed.

High intensity discharge lamp 111 emits visible light 116, 116' and infrared rays 117, 117'. Visible light 116 is transmitted to the reflector 112, and reflected to the cover 113 via the cold mirror coating 115, and then passes through the cover 113 via the hot mirror coating 118, which is on the light-diffusing unit 119. Visible light 116' is transmitted to the cover 113 and passes through the cover 113 via the hot mirror coating 118. Infrared rays 117 pass through the reflector 112 via the cold mirror coating 115 and exit the light source 11. Because infrared rays 117 generate heat, they are transmitted away from the light source 11 to dissipate the heat. Infrared rays 117' are reflected to the reflector 112 via the hot mirror coating 118 and transmitted away from the light source 11 via the cold mirror coating 115. The backlight module 1 not only provides sufficient luminous flux but overcomes the issue of heat dissipation.

Figure 5:
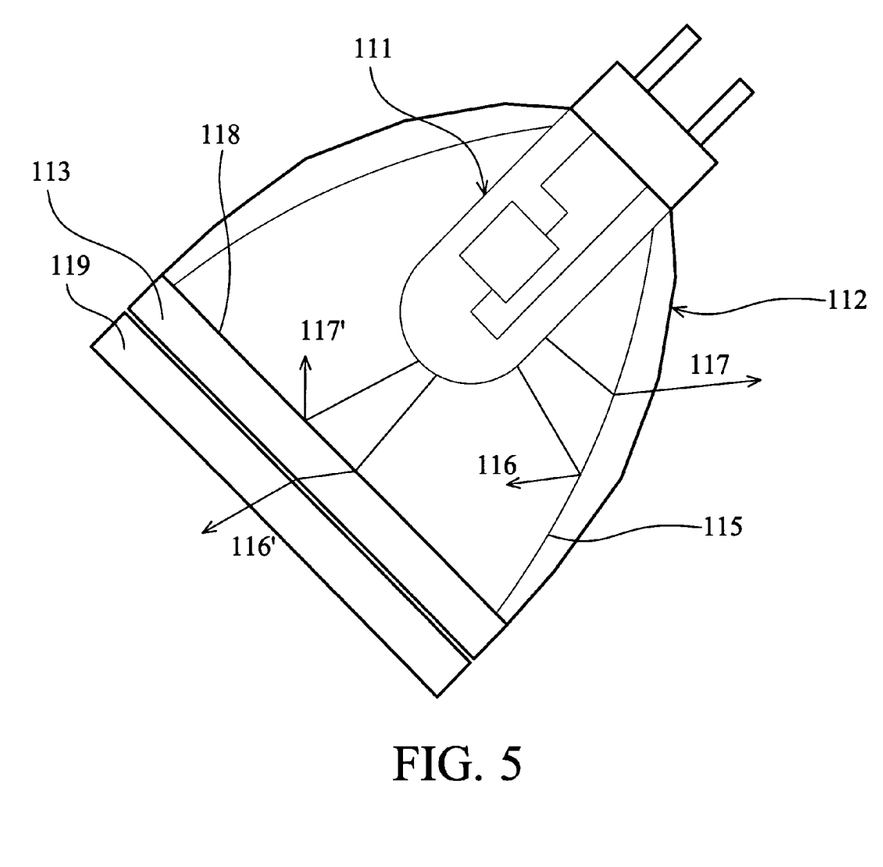
FIG. 5 is a schematic drawing of another embodiment of a reflector.

As shown in FIG. 5, the reflector 112 can be parabolic, or elliptical as in FIG. 3, or polyhedral as in FIG. 5.

Figure 6:
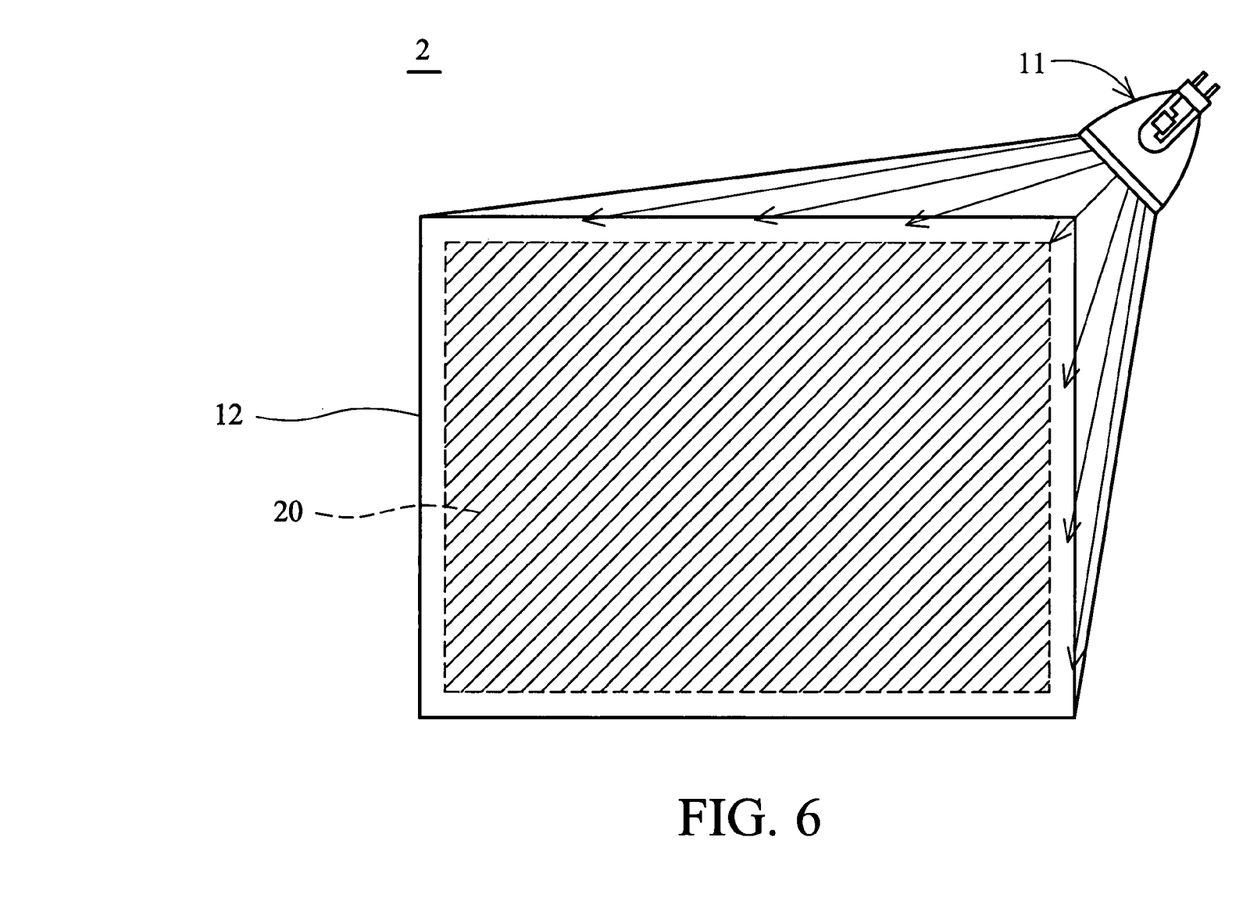
FIG. 6 is a schematic drawing of a first embodiment of a flat panel display.

As shown in FIG. 6, the flat panel display 2 comprises a light source 11, a light guide plate 12, and a display panel 20. The light source 11 is disposed at one corner of the light guide plate 12. Light-diffusing unit 119 is disposed on the light incident surface of the light guide plate 12.

Figure 7:
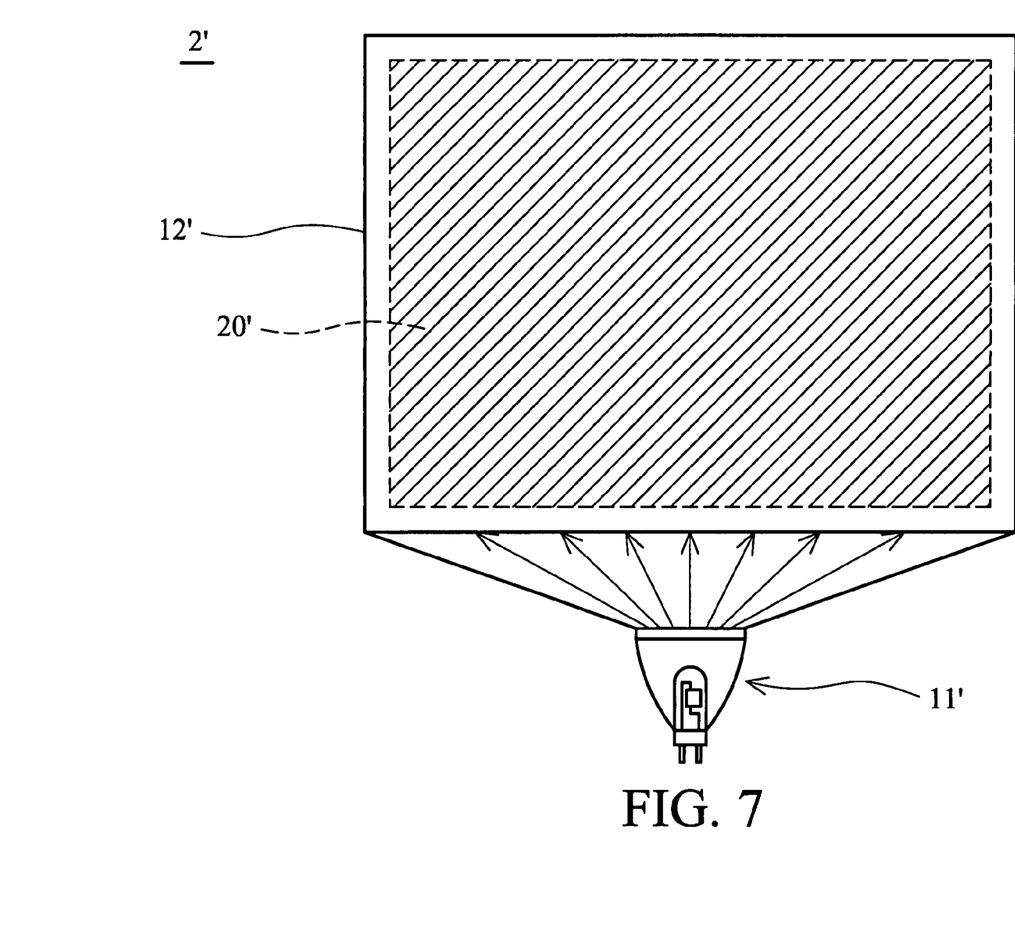
FIG. 7 is a schematic drawing of a second embodiment of a flat panel display.

As shown in FIG. 7, the flat panel display 2' comprises a light source 11', a light guide plate 12', and a display panel 20'. The light source 11' is disposed at a side of the light guide plate 12', for example, on a support under the display panel 20'. In this embodiment, light-diffusing unit 119 may be disposed on the cover 113, as shown in FIG. 3.

Figure 8:
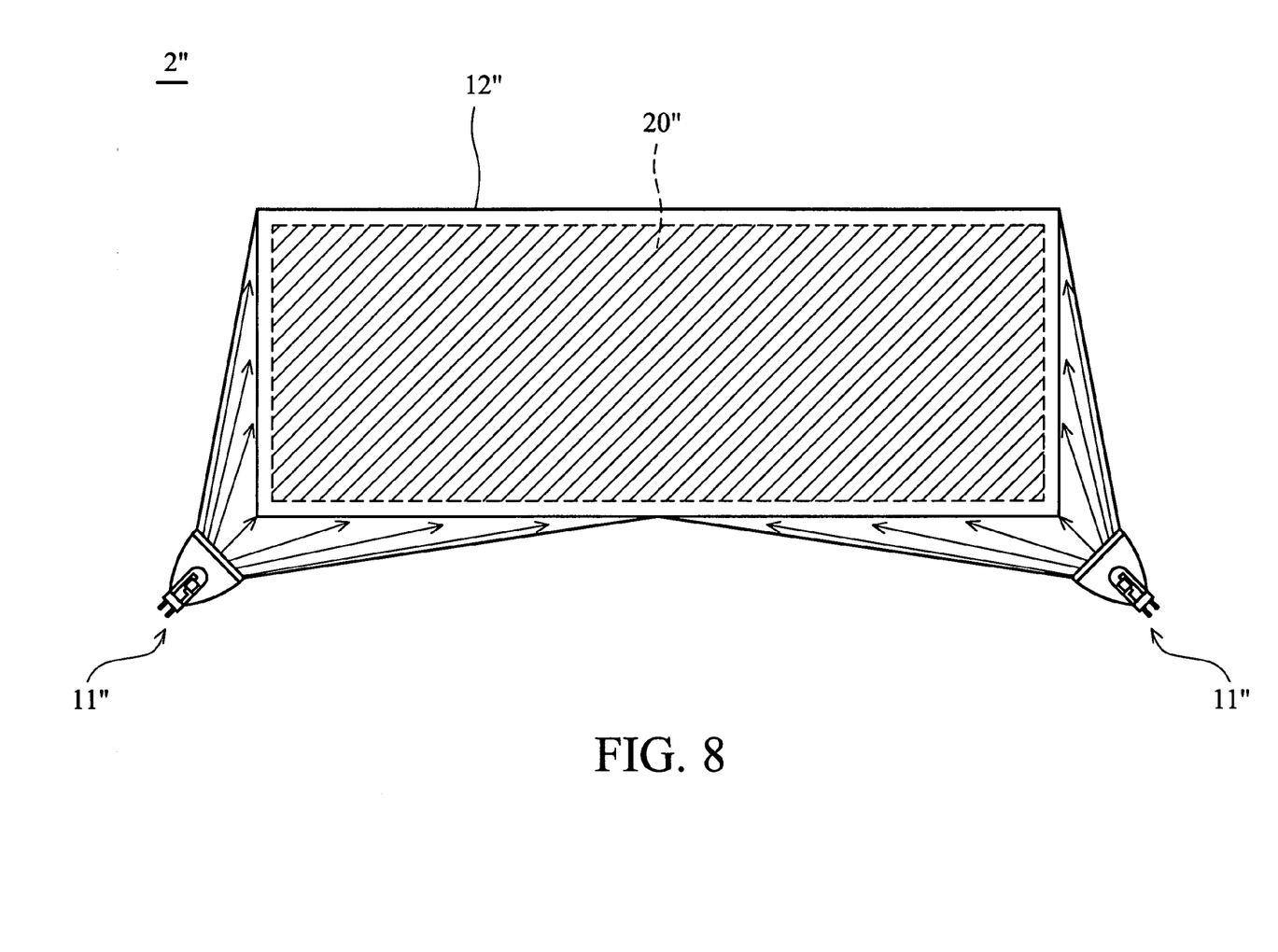
FIG. 8 is a schematic drawing of a third embodiment of a flat panel display.

As shown in FIG. 8, the flat panel display 2" comprises a light source 11", a light guide plate 12", and a display panel 20". The light source 11" is disposed at two corners of the light guide plate 12". This embodiment is applied for large displays. Here, the display 2" comprises two supports under the display panel 20". The light source 11" can be disposed on the supports.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a light source, comprising:
      a high intensity discharge lamp;
      a reflector surrounding the high intensity discharge lamp, and having an opening and a cold mirror coating formed thereon; and
      a cover disposed on the opening, including a hot mirror coating formed thereon; and
   a light guide plate disposed in the vicinity of the light source;
   wherein the high intensity discharge lamp emits visible light, reflected by the cold mirror coating, and infrared rays, passing the cold mirror coating;
   the high intensity discharge lamp emits infrared rays, reflected by the hot mirror coating, and visible light, passing the hot mirror coating; and
   the light source is not connected to the light guide plate.

2. The backlight module as claimed in claim 1, wherein the cover is pervious to light.

3. The backlight module as claimed in claim 1, wherein the cover is made of heat-resistant material.

4. The backlight module as claimed in claim 1, further comprising a light-diffusing unit disposed on the cover.

5. The backlight module as claimed in claim 1, further comprising a light-diffusing unit disposed between the cover and the opening of the reflector.

6. The backlight module as claimed in claim 5, wherein the light-diffusing unit includes a hot mirror coating formed thereon.

7. The backlight module as claimed in claim 1, further comprising a light-diffusing unit disposed on the light incident surface of the light guide plate.

8. The backlight module as claimed in claim 1, wherein the reflector comprises a parabolic structure.

9. The backlight module as claimed in claim 1, wherein the reflector comprises an elliptical structure.

10. The backlight module as claimed in claim 1, wherein the reflector comprises a polyhedral structure.

11. The backlight module as claimed in claim 1, wherein the light source is disposed at a corner of the light guide plate.

12. The backlight module as claimed in claim 1, wherein the light source is disposed at a side of the light guide plate.

13. A flat panel display comprises:
   a light source, comprising:
      a high intensity discharge lamp;
      a reflector surrounding the high intensity discharge lamp, and having an opening and a cold mirror coating formed thereon; and
   a cover disposed on the opening, including a hot mirror coating formed thereon;
   a light guide plate disposed in the vicinity of the light source; and
   a display panel disposed over the light guide plate;
   wherein the high intensity discharge lamp emits visible light, reflected by the cold mirror coating, and infrared rays, passing the cold mirror coating;
   the high intensity discharge lamp emits infrared rays, reflected by the hot mirror coating, and visible light, passing the hot mirror coating; and
   the light source is disposed in at least a corner or side of the light guide plate.

* * * * *